United States Patent Office 3,594,431
Patented July 20, 1971

3,594,431
CATALYTIC LIQUID PHASE HYDROFLUORINATION OF ALKYNES TO FORM OLEFIN FLUORIDES
Michael J. Maximovich and Henry C. Stevens, Akron, and Fred C. Trager, Barberton, Ohio, assignors to PPG Industries, Inc., Pittsburgh, Pa.
No Drawing. Filed Jan. 19, 1967, Ser. No. 610,225
Int. Cl. C07c 17/08, 21/18
U.S. Cl. 260—653.4
8 Claims

ABSTRACT OF THE DISCLOSURE

Described is the catalytic hydrofluorination of acetylenics in a liquid organic medium made up of from 3 to 15 moles hydrogen fluoride per mole of organic base such as N,N-dimethylaniline while evolving olefin monofluoride (the equimolar hydrofluorination product) product from the liquid. Exemplary conditions for maintaining this reaction media composition while evolving the product include 50° C. to 100° C. and 5 to 100 p.s.i.g.

BACKGROUND OF INVENTION

Field of invention

This invention deals with the hydrofluorination of acetylenically unsaturated compounds to provide olefinically unsaturated fluorides. It especially concerns the preparation of vinyl fluoride by the hydrofluorination of acetylene with hydrogen fluoride in a liquid reaction medium which contains a hydrofluoride salt of an amine as an important component.

Commonly assigned copending application Ser. No. 591,078, filed Nov. 1, 1966, by Frederick E. Kung, and now abandoned discloses preparing vinyl fluoride by hydrofluorination with hydrogen fluoride of acetylene in liquid reaction media containing as a vital component a fluoride salt, for example, quinoline hydrofluoride or N,N-dimethylaniline hydrofluoride.

Prior art

Non-catalytic hydrofluorination of alkynes other than acetylene at low temperatures to produce saturated difluorides is described in U.S. 2,287,934. Considerable polymerization product is formed, according to this patent. Chemical Abstracts, volume 53, 6987e, reports the hydrofluorination of vinyl acetylene in a suspension of mercury oxide in petrolatum. The original article gives conversions of vinyl acetylenes to fluoroprene never greater than 35.6 percent and reports resin yields ranging from about 26 to 47 percent (based upon fluoroprene). Journal of the American Chemical Society, volume 65, pages 587–589, Henne and Plueddeman, reports production of saturated difluorides from hydrogen fluoride and acetylene homologues in a liquid hydrogen fluoride medium at very low temperatures of between minus 40° C. and minus 70° C.

SUMMARY OF INVENTION

This invention provides an especially efficient method of hydrofluorinating acetylenes in liquid reaction media which contain hydrogen fluoride salts of organic bases, notably nitrogenous bases, such as amines. In particular, the liquid reaction media employed pursuant to this invention have as their principal components hydrogen fluoride and an organic fluoride salt such as dimethylaniline hydrofluoride. Thus, in the performance of this invention, a liquid reaction medium containing from 3 to 12 or possibly as high as 15 (more usually 5 to 10) moles of hydrogen fluoride per mole of organic base (e.g., N,N-dimethylaniline or quinoline) is established and the ratio of hydrogen fluoride to organic base is maintained. This ratio is maintained during the hydrofluorination therein, that is, while both hydrogen fluoride and acetylenic compound are fed to the reaction medium and while vinyl fluoride or like olefinically unsaturated fluoride product is evolved from the reaction medium.

Because of hydrogen fluoride's volatility and the advantages of recovering vinyl fluoride product by evolving it as gaseous product from the liquid reaction medium, continuous hydrofluorination in this desirable reaction medium encounters the tendency of the reaction medium to become depleted of hydrogen fluoride. This tendency of the hydrogen fluoride concentration to decline, it has now been found, can be overcome by conducting the hydrofluorination at super-atmospheric pressures of above about 5 up to 100 pounds per square inch gauge or higher (rarely, however, more than 150 pounds per square inch gauge). Thus, in performance of this invention, hydrofluorination is effected in a liquid reaction medium whose composition is controlled to maintain therein a relatively consistent ratio of hydrogen fluoride to organic base which is more than 3 but rarely in excess of 15 moles (usually up to about 10 moles) of hydrogen fluoride per mole of organic base during the concurrent feed of both the additional hydrogen fluoride and acetylenic compound to the liquid medium. The particular ratio within this range which is desirably established and maintained will vary, depending upon the particular organic base, fluoride product, etc.

With N,N-dimethylaniline as the organic base, for example, preparation of vinyl fluoride from hydrogen fluoride and acetylene involves controllably maintaining the liquid reaction medium composition to between 5 and 7 moles of hydrogen fluoride per mole of dimethylaniline. At super-atmospheric pressures of from about 5 pounds per square inch gauge up to 150 pounds per square inch gauge and at temperatures of between 50° C. and about 100° C., the mole ratio of hydrogen fluoride to N,N-dimethylaniline should ideally be maintained at about 6 to 1. On the other hand, with quinoline as the organic nitrogenous base, the idealized mole ratio under substantially the same conditions is about 7 moles of hydrogen fluoride per mole of quinoline.

Further involved in the maintenance of the desired steady state composition of the liquid reaction medium, particularly with respect to its hydrogen fluoride content, is the advantage of operating at temperatures of above 50° C. and more usually in the range of 60° C. to 100° C. Although hydrofluorination proceeds at temperatures below 50° C., higher temperatures on the order of 60° C. to 100° C., more notably at about 70° C. to 85° C., are especially useful since at these temperatures polymer formation (and hence loss of desired product) is suppressed, even avoided.

A further benefit of controlling the mole ratio of hydrogen fluoride to organic base in the liquid reaction medium is the realization therein of essentially complete acetylene conversion. In a continuous procedure, for example, wherein acetylene is hydrofluorinated to yield vinyl fluoride and product vinyl fluoride is evolved as gas from the liquid reaction medium, the vinyl fluoride concentration in the evolved gas is important to the efficient recovery of the fluoride product. The richer the evolved gaseous mixture is in vinyl fluoride and the leaner it is in other components (especially if it is free of acetylene) the better. By virtue of this invention, gaseous mixtures evolved from the liquid reaction medium may be made up of essentially only vinyl fluoride and hydrogen fluoride, i.e., acetylene free.

Essentially complete conversion of acetylene fed to the liquid medium in the continuous process avoids or keeps to a minimum the presence of acetylene in the evolved vinyl fluoride gases. According to this invention, it has been found that substantially complete hydrofluorination of acetylene (and hence an essentially acetylene free evolved product stream) is attained by providing for a reaction medium composition of the herein described mole ratio of hydrogen fluoride to base, other factors such as the presence of an appropriate amount of active catalyst and the like being otherwise provided for. By regulating conditions so as to maintain 7 moles of hydrogen fluoride per mole of quinoline in the liquid reaction medium to which acetylene and hydrogen fluoride are fed (and from which vinyl fluoride gaseous product evolves), conversions approaching 100 percent, certainly well above 90 percent, may be realized.

According to a typical practice, the desirable liquid reaction medium is initially established by charging to the reactor the appropriate proportions of hydrogen fluoride and organic base such as dimethylaniline (the term "dimethylaniline" being herein used as referring to the tertiary amine N,N-dimethylaniline) under conditions of temperature which provide for a liquid composition of the hydrogen fluoride and dimethylaniline. Ideally, this proportion is approximately 6 moles of hydrogen fluoride per mole of dimethylaniline.

Mercury compound catalyst is then charged, usually an amount which constitutes from 0.01 to 2 percent by weight of the liquid reaction medium, and the temperature of the medium adjusted to that which is desired, usually in preferred operation, about 70° C.

Thereafter, gaseous acetylene or like acetylenic compound and gaseous hydrogen fluoride are fed, usually from separate sources, to the liquid reaction medium while maintaining a pressure of from about 5 to 100 pounds per square inch gauge pressure. Although hydrofluorination theoretically requires equimolecular quantities of acetylene and hydrogen fluoride, feeding a slight excess of hydrogen fluoride helps to maintain the desired composition of the liquid reaction medium (a mole ratio of hydrogen fluoride to dimethylaniline of 6 moles of hydrogen fluoride per mole of dimethylaniline). The exact excess of hydrogen fluoride will vary, depending, among other things, upon the specific temperature of the reaction medium, the particular superatmospheric pressure and also specific organic base. With dimethylaniline, feeding hydrogen fluoride at the rate of 1.3 moles per mole of acetylene will maintain the hydrogen fluoride concentration in the reaction medium at a mole ratio of 6 to 1 when the reaction medium is 70° C. and the pressure is 12 pounds per square inch gauge. By way of illustration, the idealized mole ratio of 7 to 1 with quinoline as the organic base is maintained by feeding approximately 2 moles of hydrogen fluoride per mole of acetylene under substantially the same conditions.

Accordingly, continuous preparation of vinyl fluoride by hydrofluorination of acetylene entails feeding upwardly of one mole of hydrogen fluoride (usually at least 1.1 moles) to about 2 to 2.5 moles of hydrogen fluoride, rarely more, per mole of acetylene. A portion of the hydrogen fluoride fed to the reaction system may be hydrogen fluoride which is recovered from that which evolves from the reaction medium in gaseous admixture with vinyl fluoride. Thus, the feed of excess hydrogen fluoride need not be a total loss to the process.

In the continuous formation and evolution of vinyl fluoride from the reaction medium to which reactants are concurrently fed, additional fresh catalyst is periodically or continuously incorporated in the reaction medium. Mercury catalyst's effectiveness appears to decline as a function the length of time it has been exposed to hydrofluorination conditions. Usually this decline manifests itself by an abrupt decline in the vinyl fluoride content of the gases evolving from the reaction medium coupled with a sharp increase in the acetylene content of those gases.

Addition of appropriate catalyst quantities to the reaction medium, usually immediately prior to an anticipated sharp drop in hydrofluorination, is, therefore, a recommended practice. Such addition may be programmed, based upon prior experiences with the specific system, to add the catalyst on a predetermined periodic basis. A continuous or semi-continuous feed of fresh catalyst to the reaction medium is also possible.

The following examples illustrate the manner in which the present invention may be performed:

Example I.—The reactor was provided by a vertically disposed 2½ inch inner diameter Teflon tube 24 inches in height having an approximate volume of 1700 cubic centimeters. This reactor was provided with a Teflon-coated copper U-shaped heating coil, a cylindrical (½ inch outer diameter and 1⅝ inches long) gas sparger, bottom drain, catalyst addition tube (a ⁵⁄₁₆ inch outer diameter tube extending downwardly within 2 inches of the normal liquid level in the reactor) and an exit gas tube. The coil served as a cooling means during charging of the reactor by circulating ice water therethrough. During the hydrofluorination, thermostatically controlled hot water was circulated through the coil to heat the reaction medium and maintain it at the desired specified temperature.

Gases evolving from the reaction medium left the reactor via the exit gas tube and were passed through a pair of steel condensers in series. From there, they passed into a pressure letdown system to reduce the pressure of the exit gases to atmospheric pressure. Once at atmospheric pressure, the gases which included fluoride product were scrubbed by passage through two polyethylene scrubbers, each of which contained an aqueous hydroxide solution containing 25 weight percent KOH to remove hydrogen fluoride. The resulting HF-free gas was then passed through a wet test meter, dryer and gas-liquid chromatographic sampling device, a rotameter and then exhausted to a hood.

Using this equipment, vinyl fluoride was prepared from acetylene and hydrogen fluoride in an appropriate liquid reaction medium by charging 2.5 moles (322 grams) of quinoline into the reactor (previously nitrogen flushed) while circulating ice water through the U-shaped coil until the quinoline was at between 5° C. to 10° C. Thereafter, a total of about 17.5 moles (350.2 grams) of hydrogen fluoride gas was passed via the sparger into this cooled quinoline. This provided an initial reaction medium containing about 7 moles of hydrogen fluoride per mole of quinoline.

Catalyst was provided as a quinoline solution of diphenyl mercury, the concentration of diphenyl mercury being such that 5 cubic centimeters of the solution contained 0.8845 gram of diphenyl mercury (equivalent to 0.5 gram mercury). Ten cubic centimeters of this solution were added.

Operating at a reactor pressure of 6 pounds per square inch gauge and at a liquid reaction medium temperature of 70° C., gaseous hydrogen fluoride and acetylene (each at approximately 6 pounds per square inch gauge pressure) were fed for a 12 hour period at a mole ratio of 1.1 moles of hydrogen fluoride per mole of acetylene, the acetylene feed rate being one mole per hour. A 10 cubic centimeter portion of the catalyst solution was charged at the 5 hour mark. During this run, the temperature, pressure and hydrogen fluoride feed rate (relative to acetylene) was such that the reaction medium composition contained between about 6 and 7 moles of hydrogen fluoride per mole of quinoline.

The vinyl fluoride concentration in the exit gases (after HF removal) following the incorporation of fresh mercury catalyst was about 95 to 97 percent, indicating substantially no acetylene. An overall yield of 264 pounds of vinyl fluoride per pound of catalyst on a mercury basis was realized.

Example II.—Using the equipment of Example I and following the procedure outlined except that the superatmospheric pressure was 12 pounds per square inch gauge and the run extended over 32 hours during which 5 cubic centimeter portions of the catalyst containing solution were added at four times, vinyl fluoride composition in the exit stream commenced dropping, notably at the 8th, 13th, 20th and 26th hour of operation. The feed ratio of hydrogen fluoride and acetylene was changed several times during the run, as follows:

TABLE I

| Period of operation: | Mole ratio HF to acetylene |
|---|---|
| 1st to 13th hour | 2.03 to 1 |
| 13th to 20th hour | 2.15 to 1 |
| 20th to 25th hour | 1.69 to 1 |
| 25th to 32nd hour | 1.71 to 1 |

Throughout the run, the mole ratio of hydrogen fluoride to quinoline in the reaction medium was maintained at substantially 7 to 1 although some slight variation during the first 20 hours above this ratio was observed. Over the course of the last 12 hours of the run, the mole ratio declined slowly to about 6.5 to 1, indicating under the conditions of this run it is advisable to feed somewhat greater than 1.7 moles of HF per mole of acetylene if the HF concentration is to be maintained at 7 moles per mole of quinoline in the reaction medium.

Vinyl fluoride concentrations in the exit gas (after HF removal) were uniformly above 95 percent except immediately prior to fresh catalyst addition. Overall, 399 pounds of vinyl fluoride per pound of catalyst on a mercury basis were produced during this run.

Example III.—Using the equipment and following the general procedure thereof, Example I was repeated using N,N-dimethylaniline in lieu of quinoline as the organic nitrogenous base component of the liquid reaction medium to provide an initial medium containing 7 moles of hydrogen fluoride per mole of dimethylaniline. Acetylene and hydrogen fluoride were fed to this liquid reaction medium while it was under a superatmospheric pressure of 12 pounds per square inch gauge over a 30 hour period. Periodic additions of 5 cubic centimeter portions of the diphenyl mercury solution were made at the 9th, 18th and 24th hour of operation. During the course of such operation, acetylene was fed at a rate of approximately one mole per hour. For the first 9 hours of operation, 1.3 mole of HF per mole of acetylene were fed, during the 9th to the 18th hour of operation, the ratio was 1.33 to 1, whereas for the 18th to 24th hour period, the mole ratio was 1.1 to 1 and for the last 6 hours of the run, the mole ratio of hydrogen fluoride to acetylene was 1.41 to 1.

Vinyl fluoride at the rate of 439 pounds of vinyl fluoride per pound of catalyst on a mercury basis was produced. Exit gases from the reactor regularly had a vinyl fluoride content above 98 percent except for brief intervals immediately before catalyst addition.

Throughout this run, the mole ratio of hydrogen fluoride to dimethylaniline in the liquid recation medium was mainly 6 to 1, with this mole ratio being most precisely maintained during that period when between 1.3 to 1.4 moles of HF per mole of acetylene were fed.

Example IV.—The procedure and apparatus of Example I were followed except that the superatmospheric pressure was 12 pounds per square inch gauge, the initial charge to the reactor established a liquid reaction medium containing 7 moles of hydrogen fluoride per mole of dimethylaniline, and mercuric oxide rather than diphenyl mercury was the source of catalyst.

Addition of mercuric oxide was in this operation achieved by draining a portion of the reaction solution from the reactor, weighing the appropriate amount of mercuric oxide thereinto and stirring overnight, whereafter the solution was charged back to the reactor.

This run extended over about 58 hours. Table II lists the various pertinent conditions of operation and results obtained during each of the nine successive periods of operation in which conditions were altered during this run:

TABLE II

| Time, hours | HF [1]/DMA [2] mole ratio | | HF [1]/$C_2H_2$, mole ratio fed | Catalyst moles, HgO added | Production rate, lbs. VF [3]/lbs. Hg for period |
|---|---|---|---|---|---|
| | Start | End | | | |
| 11 | 6.82 | 6.21 | 1.35 | 0.005 | 452 |
| 6 | 6.21 | 6.22 | 1.39 | 0.00125 | 964 |
| 5 | 6.22 | 6.25 | 1.38 | 0.00125 | 780 |
| 5 | 6.25 | 6.34 | 1.41 | 0.00125 | 787 |
| 5 | 6.34 | 6.20 | 1.35 | 0.00125 | 829 |
| 8 | 6.20 | 6.14 | 1.36 | 0.0025 | 695 |
| 5 | 6.14 | 6.18 | 1.40 | 0.00125 | 815 |
| 8 | 7.13 | 6.93 | 2.02 | 0.0025 | 696 |
| 5 | 6.93 | 6.85 | 1.89 | 0.00125 | 796 |

[1] HF is hydrogen fluoride.
[2] DMA is N,N-dimethylaniline.
[3] VF is vinyl fluoride.

Except for those periods of time immediately preceding the incremental addition of catalyst, the vinyl fluoride concentration after HF removal was above 95 percent and approached 100 percent.

Example V.—Following the procedure of Example I and using the apparatus therein described, 2-fluoropropene was produced by hydrofluorinating methyl acetylene. The reaction medium contained hydrogen fluoride and dimethylaniline in the mole ratio of 6 to 1 at the outset. After 8 hours, the ratio was 5.64 to 1. Over this period, a total of 8 moles of methyl acetylene and 10.85 moles of hydrogen fluoride were charged at a uniform rate. Produced in this run were 437 pounds of 2-fluoropropene per pound of catalyst on a mercury basis.

Example VI.—The procedure and apparatus of Example I were employed to produce 2-fluoropropene utilizing a superatmospheric pressure of 12 pounds per square inch gauge and a temperature of 85° C. At the outset, the reactor was charged with 6.27 moles of hydrogen fluoride per mole of dimethylaniline.

During a 22 hour run, a total of 22.1 moles of methyl acetylene and 44.75 moles of hydrogen fluoride were fed at a uniform rate to the liquid reaction medium. Catalyst charged to the system was equal to the addition of 0.5 gram on a mercury basis.

2-fluoropropane was produced at the rate of 1847 pounds per pound of catalyst on a mercury basis. At the end of the run, the reaction medium contained 5.6 moles of hydrogen fluoride per mole of dimethylaniline.

As illustrated by the foregoing examples, catalytic hydrofluorination of acetylenic compounds such as acetylene uses mercury catalysis. A wide variety of mercury salts provide for the requisite catalysis. Thus, those mercury salts or compounds which have heretofore been recognized as catalysts for the vapor phase reaction of acetylene and hydrogen fluoride may be charged to the reactor. Typical of such mercury compounds are diphenyl mercury, mercuric oxide, mercuric fluoride, mercuric nitrate, mercuric oxalate, mercuric oxyfluoride, mercuric sulfate, mercuric sulfide, mercurous acetate, mercurous trifluoroacetate, mercurous fluoride, mercurous nitrate, mercurous oxide, mercurous phosphate, mercurous sulfate and mercurous sulfide. It is believed that, notwithstanding the particular mercury compound which is charged to the reaction zone, the mercury in the reaction zone is in the form of a mercury fluoride (either or both of the known mercury fluorides). If true, it may well be it is the mercury fluoride that is the catalyst. Regardless, the source of the catalytic mercury can be from widely varied inorganic and organic mercury compounds. Note the examples demonstrate the use of an organic mercury compound, diphenyl mercury, as well as an inorganic mercury compound, mercuric oxide.

Although any of the aforementioned mercury salts or mercury compounds serve as a source for catalyst, of considerable significance in selection of a mercury compound is the ease with which it can be effectively dispersed in the liquid medium. Many are poorly soluble or disperse only with difficulty in one or more of the liquid reaction media used in the performance of this invention. In this connection, special expedients and techniques designed to facilitate or insure effective dispersion, solution or distribution of the mercury compound in the reaction medium are advisedly used where the mercury compound in question presents such a problem. Obviously, depending upon the specific reaction medium, each useful mercury compound will vary in the ease or lack thereof with which it dissolves or otherwise disperses. Mercuric oxide is, for example, insoluble in the more preferred reaction media which include dimethylaniline and quinoline. Special steps to disperse it well in the amine, therefore, are practiced.

Catalyst concentration in the liquid reaction medium is relatively unimportant; hence, it may vary over wide ranges without affecting the operability of the process. Typical catalyst concentrations are those provided by charging between 0.01 and 2 percent by weight (on a mercury basis) of the mercury compound. In the continuous production of vinyl fluoride or like olefinic fluoride, periodic or continuous addition of fresh mercury catalyst is practiced. The exact amount of mercury compond which is added obviously will vary. It is selected so as to maintain a high concentration of vinyl fluoride in the effluent gases leaving the reactor, i.e., to sustain a high conversion of acetylene. More frequent yet small amounts of catalyst rather than less frequent larger amounts (even though the total amount of catalyst is the same) give the better results.

In addition to acetylene and methyl acetylene which, as illustrated by the examples, may be hydrofluorinated pursuant to this invention, other acetylenic compounds are susceptible of hydrofluorination. In general, 2 to 6 carbon alkynes may be hydrofluorinated. These alkynes may in addition to acetylenic unsaturation contain other functional groups, for example, an olefinic linkage; such as vinyl acetylene may be hydrofluorinated. In general, the hydrofluorination of unsymmetrical alkynes proceeds in the present process according to Markownikoff's rule. The process is especially applicable to the hydrofluorination of acetylenic unsaturated compounds whose olefin fluoride derivative is a vapor under conditions of hydrofluorination, notably reaction temperatures as high as about 100° C. and superatmospheric pressures of up to 100 or 150 pounds (more usually 5 to 50) per square inch gauge.

Although quinoline and dimethylaniline illustrate preferred organic base materials which couple with hydrogen fluoride to provide an appropriate fluoride salt component, other organic bases are also useful in the performance of this invention. Thus, the liquid reaction media of the present invention may include as their principal component besides hydrogen fluoride any of a wide variety of nitrogen bases, to wit, primary, secondary, tertiary amines including such amines as triethylamine, tri-n-ethylamine, triisopropylamine; the phenyl tertiary amines exemplified by N,N-dialkylanilines such as N-ethyl-N-methylaniline as well as the exemplary dimethylaniline. Aniline itself is useful. Heterocyclic amines exemplified by quinoline are of use and include heterocyclic compounds such as piperidine, piperazine, pyridine, isoquinoline, quinaldine, alpha- and beta-picoline, methyl morpholine, triethylene diamine, quinuclidine, and the like. These amines coordinate or otherwise combine with hydrogen fluoride to form useful flouride salts (or hydrogen fluoride salts) which are believed to be the form they assume in the reaction medium.

In general, thus, the organic base which is employed in the provision of the liquid reaction medium is an amine. Nevertheless, other non-nitrogenous organic bases such as the glycol ethers such as diglyme; nitriles exemplified by acetonitrile and benzonitrile; esters exemplified by di-n-butyl adipate, diethyl-O-phthalate; by way of illustration, may be employed as the organic base constituents.

For the most part, organic bases useful in performance of the present invention are also normally liquid, relatively high boiling, boiling above 80° C., usually above 150° C. to 300° C., which coordinate readily with hydrogen fluoride to provide what may be termed a fluoride salt of the organic base. Whatever the manner of combination, the resulting liquid systems of the organic base and hydrogen fluoride (fluoride salt) have the net effect of suppressing the boiling point of the hydrogen fluoride.

The liquid reaction medium of this invention includes from 3 to 12 moles of hydrogen fluoride per mole of the organic base. The specific chemical or physical combination of the hydrogen fluoride and organic base is believed to be that which results from the combination or coordination with the organic base of at least one mole (more commonly several moles) of hydrogen fluoride to form a fluoride or polyfluoride salt (or hydrogen fluoride) of the organic base. Whether all the additional hydrogen fluoride present in the reaction medium forms a polyfluoride salt or dissolves in the hydrogen fluoride salt is not clear. It may also be that the salt complexes with further hydrogen fluoride to provide a loosely bound combination of the hydrogen fluoride and the fluoride salt of the organic base.

Regardless of whether the hydrogen fluoride and organic base are intercombined by a chemical reaction or by a physical combination, the liquid reaction media employed in the performance of the present invention are made up of hydrogen fluoride and the organic base. Besides charging them initially as shown in the examples, they may be premixed in various proportions and then charged.

While the present invention has been described with reference to specific details of certain embodiments, it is not intended the invention be construed as limited to such details except insofar as they appear in the appended claims.

We claim:

1. In the catalytic equimolar hydrofluorination reaction of hydrogen fluoride and a 2 to 6 carbon alkyne having but one triple bond to produce the olefin fluoride thereof wherein the hydrofluorination is effected in a liquid reaction medium containing mercury fluoride catalyst consisting essentially of hydrogen fluoride and normally liquid organic base which coordinates readily with hydrogen fluoride to provide a fluoride salt of the organic base which salt has the effect of suppressing the boiling point of hydrogen fluoride while evolving a gaseous mixture of product olefin fluoride and hydrogen fluoride from the liquid medium whereby the liquid medium becomes depleted of hydrogen fluoride, the improvement which comprises establishing a hydrogen fluoride content in said liquid medium of from 3 to 15 moles per mole of organic base selected from the group consisting of quinoline and dimethylaniline, feeding hydrogen fluoride and the alkyne to the medium while forming olefin fluoride product therein and evolving said product in gaseous mixture with hydrogen fluoride from the medium, controlling the hydrogen fluoride content of said liquid medium within the established range while forming olefin fluoride therein and evolving it and hydrogen fluoride therefrom and maintaining the liquid reaction medium under superatmospheric pressure of 5 to 150 pounds per square inch gauge.

2. The method of claim 1 wherein the liquid reaction medium is maintained at from 50° C. to 100° C.

3. The method of claim 1 wherein the alkyne is acetylene and the olefin fluoride is vinyl fluoride or the alkyne is methyl acetylene and the olefin fluoride is 2-fluoropropene.

4. A method of catalytically hydrofluorinating a 2 to 6 carbon alkyne having but one triple bond to produce the olefin fluoride thereof which comprises establishing a liquid reaction medium containing mercury fluoride catalyst and having as its principal components hydrogen fluoride and an organic base selected from the group consisting of quinoline and dimethylaniline, said medium containing from 5 to 10 moles of hydrogen fluoride per mole of said organic base, feeding said alkyne and hydrogen fluoride to the liquid medium while maintaining the liquid medum at 50° C. to 100° C., forming the olefin fluoride in the liquid medium by the equimolar reaction of the alkyne and hydrogen fluoride, evolving from the liquid medium a gaseous mixture of product olefin fluoride and hydrogen fluoride and maintaining the hydrogen fluoride content of the liquid medium composition between 5 and 10 moles of hydrogen fluoride per mole of said organic base while the alkyne and hydrogen fluoride is being fed and the olefin fluoride product being evolved in gaseous mixture with hydrogen fluoride by applying a superatmospheric pressure of 5 to 150 pounds per square inch gauge to the liquid reaction medium and feeding more than one mole of hydrogen fluoride per mole of alkyne to the reaction medium.

5. The method of claim 4 wherein additional mercury compound catalyst is periodically added to the liquid medium.

6. The method of claim 4 wherein hydrogen fluoride recovered from the evolved gaseous mixture is fed to the liquid medium.

7. The method of claim 4 wherein from 1.1 to 2.5 moles of hydrogen fluoride per mole of the alkyne are fed.

8. The method of claim 4 wherein the alkyne is acetylene or methyl acetylene.

References Cited
UNITED STATES PATENTS 2,425,991    8/1948    Burk et al. _____ 260—653.6

DANIEL D. HOROWITZ, Primary Examiner